(12) United States Patent
Lamparter et al.

(10) Patent No.: US 9,285,798 B2
(45) Date of Patent: Mar. 15, 2016

(54) PRODUCTION MANAGEMENT FOR MANUFACTURING EXECUTION SYSTEMS

(75) Inventors: Steffen Lamparter, Munich (DE); Christoph Legat, Olching (DE); Raffaello Lepratti, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 573 days.

(21) Appl. No.: 13/593,926

(22) Filed: Aug. 24, 2012

(65) Prior Publication Data

US 2013/0190913 A1 Jul. 25, 2013

(30) Foreign Application Priority Data

Aug. 25, 2011 (EP) .................................. 11178740

(51) Int. Cl.
  *G05B 19/418* (2006.01)
  *G06Q 10/08* (2012.01)
(52) U.S. Cl.
  CPC .............. *G05B 19/418* (2013.01); *G06Q 10/08* (2013.01)
(58) Field of Classification Search
  CPC .................................................... G05B 19/418

USPC .................................. 700/99; 340/572.4, 8.1
See application file for complete search history.

(56) References Cited

U.S. PATENT DOCUMENTS

2003/0227392 A1* 12/2003 Ebert et al. ............... 340/825.49
2006/0250248 A1* 11/2006 Tu et al. .................... 340/572.4

* cited by examiner

*Primary Examiner* — Tejal Gami
(74) *Attorney, Agent, or Firm* — Laurence Greenberg; Werner Stemer; Ralph Locher

(57) ABSTRACT

First inter-organizational tracking & tracing systems facilitate timely identification and handling of disruptions along the supply chain. However, these systems typically operate at supply chain management (SCM) and enterprise resource planning system (ERP) level and therefore lack knowledge and control over production processes. The idea is to bridge the gap between logistics and production IT by proposing a novel architecture for coupling the manufacturing operations as defined in IEC 62264 with an EPCIS-compliant real-time tracking & tracing system. The system leverages logic-based complex event processing for detecting critical disruptions in the supply chain and initiates rescheduling of production. It is shown that in the presence of unexpected events the rescheduling algorithm minimizes delays and inventory costs while avoiding <<nervous schedules>> caused by frequent changes.

10 Claims, 9 Drawing Sheets

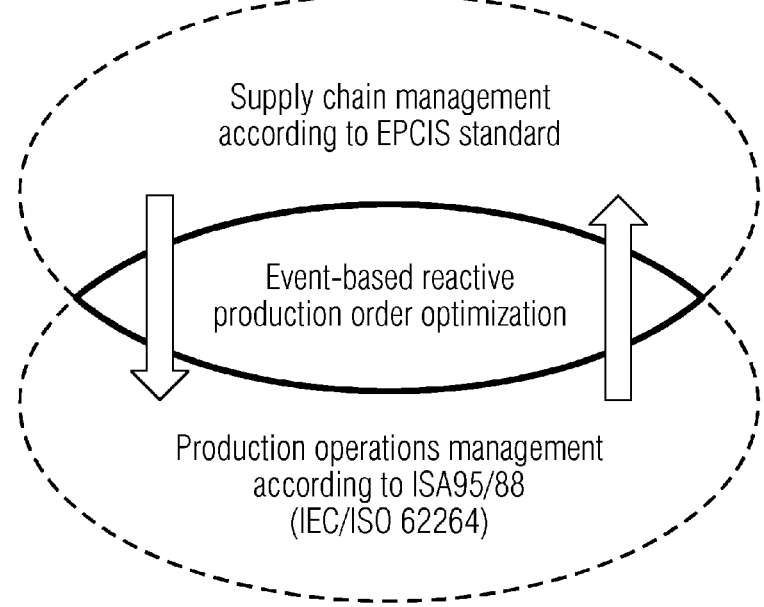
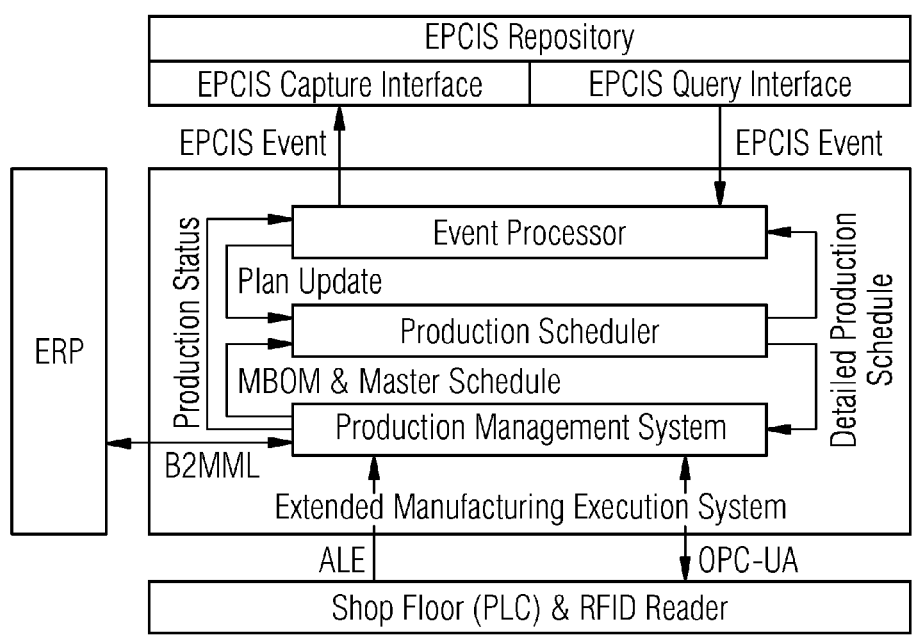

PRODUCTION MANAGEMENT FOR MANUFACTURING EXECUTION SYSTEMS

CROSS-REFERENCE TO RELATED APPLICATION

This application claims the priority, under 35 U.S.C. §119, of European application EP 11 1787 40.4, filed Aug. 25, 2011; the prior application is herewith incorporated by reference in its entirety.

BACKGROUND OF THE INVENTION

Field of the Invention

The present invention relates to a method for production management in a Manufacturing Execution System (MES) according to claims as well as a system for carrying out the method.

Over the last years the trend towards outsourcing and globalization in the automotive and other industries led to increasingly distributed production processes. These processes often rely on long and complex logistics networks involving a large number of companies geographically spread around the world. The increasing complexity of the processes leads to error-proneness and consequently uncertainties about the timely arrival of vendor goods at production facilities. The uncertainties can be reduced by real-time monitoring and recording the shipment of goods along the supply chains. Such tracking & tracing systems are facilitated by recent advances in RFID and other Auto-ID technologies. As logistic processes usually involve several companies common data standards are required. The EPC Network with its EPCIS specification (EPC Information Services (EPCIS) Version 1.0.1 Specification Source: http://www.epcglobalinc.org; http://www.gs1.org/gsmp/kc/epcglobal/epcis) is widely used for tracking & tracing applications and can be seen as a de facto standard.

The collected tracking & tracing data can be used to analyze the material flow and determine crucial deviation from the planned processes. According to Pfohl et al. (2008) three main classes of risks can be distinguished:

i) sourcing logistics and supply risks (e.g. early/late delivery of vendor parts),
ii) distribution logistics and demand risks (e.g. change of production deadlines), and
iii) process and control risks (e.g. quality violations or machine faults within own production process).

Once such disruptions are detected, the involved companies have to decide how to cope with them. For example, late arrival of input materials may require re-sequencing jobs within a production line—particularly in case of Just-in-Time (JIT) and Just-In-Sequence (JIS) settings. As many of these disruptions become known at short notice, production plans have already been fixed and dispatched to the production systems. If changes at this stage have to be implemented, detailed knowledge about the manufacturing process and current status of production is required. As such detailed operations knowledge is available only up to the manufacturing execution layer (e.g. as defined in ISA-95 (ANSI/ISA-95.00.01-2000 Enterprise-Control System Integration Part 1: Models and Terminology)/IEC 62264 (IEC 62264-1 Enterprise-control system integration—Part 1: Models and terminology)), current approaches to disruption management on a higher level of enterprise IT are ill-suited to cope with many types of short-term interferences.

One of the central challenges is how inter-organizational tracking & tracing information can be leveraged for efficient production planning and control. Realizing such systems requires exchanging tracking & tracing information horizontally between different companies and vertically between the different levels of enterprise IT from shop floor to ERP/SCM. Today RFID based solutions are predominantly deployed in the area of production logistics within a single company. Such vertical RFID data integration is realized using RFID middleware. Applied in an inter-organizational setting RFID may improve speed, accuracy, and transparency of information provisioning along the supply chain. As standardization is essential in an inter-organizational environment, EPCIS (EPCglobal, 2007) gained much attention.

However the current version of EPCIS is not sufficient for effective disruption management. What is aimed is a minimal set of extensions in order to be as standard compliant as possible.

SUMMARY OF THE INVENTION

It is an object of the invention to provide a method for a production management in a manufacturing execution system (MES) which overcomes the problems as:
fundamental changes to the standards applied in existing systems for a new solution;
bridging the gap between supply chain and manufacturing operations management; and
minimizing delays and inventory costs while avoiding <<nervous schedules>> caused by frequent changes.

The object is solved with the features given in the claims regarding a method for a production management in a manufacturing execution system (MES) and with a system according to the claims.

A method for production management for an enterprise resource planning system—in the following denoted by ERP-System—and a manufacturing execution system—in the following denoted by MES—, the MES containing: a production management system, a production scheduler and an event processor. The method includes the steps of:

A. transmitting an order from the ERP-System to the production management system, the order containing
the product to be produced,
the product process,
the required source material and
the due date of the product;

B. transmitting a schedule to the production scheduler, the schedule containing:
at least the order of step A;
a description indicating which source material is taken from an inventory and when the product will be finished;

C. transmitting a notification from the production scheduler to the event processor when a production job has to be completed;

D. information about an expected delivery of the source material is received by a tracking and tracing system; the tracking and tracing system notifying the event processor on a observation of the source material or a deviation regarding delivery of a required source material;

E. the event processor carrying out a situation recognition on the observation and deviation by a function ((2), (3), (4)) which detects situations having a influence on at least one process parameter due to the deviation of the delivery of the required source material;

F. depending on the situation recognition the event processor notifies the production scheduler with
the source material and
expected time and served time of delivery of said source material;

G. based on the data notified in step F the production scheduler carries out a rescheduling of production jobs by optimizing process parameters and/or by minimizing the number of required changes in the schedule.

The before defined method allows:

disruption management on production level with the approach to event-based reactive production order optimization;

the proposed architecture seamlessly integrating cross-company tracking and tracing functionality with a company's manufacturing operations management; and enabling short-term reactions on critical disruptions/deviations a Manufacturing Execution System MES is extended with an EPCIS-compliant event processing mechanisms that supports identification of critical situations in the supply chain and triggers appropriate production rescheduling.

Other features which are considered as characteristic for the invention are set forth in the appended claims.

Although the invention is illustrated and described herein as embodied in a production management for manufacturing execution systems, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is an illustration of an integration of supply chain information into production operations management according to the invention;

FIG. 2 is an illustration of a conceptual architecture;

DETAILED DESCRIPTION OF THE INVENTION

Figure 3:
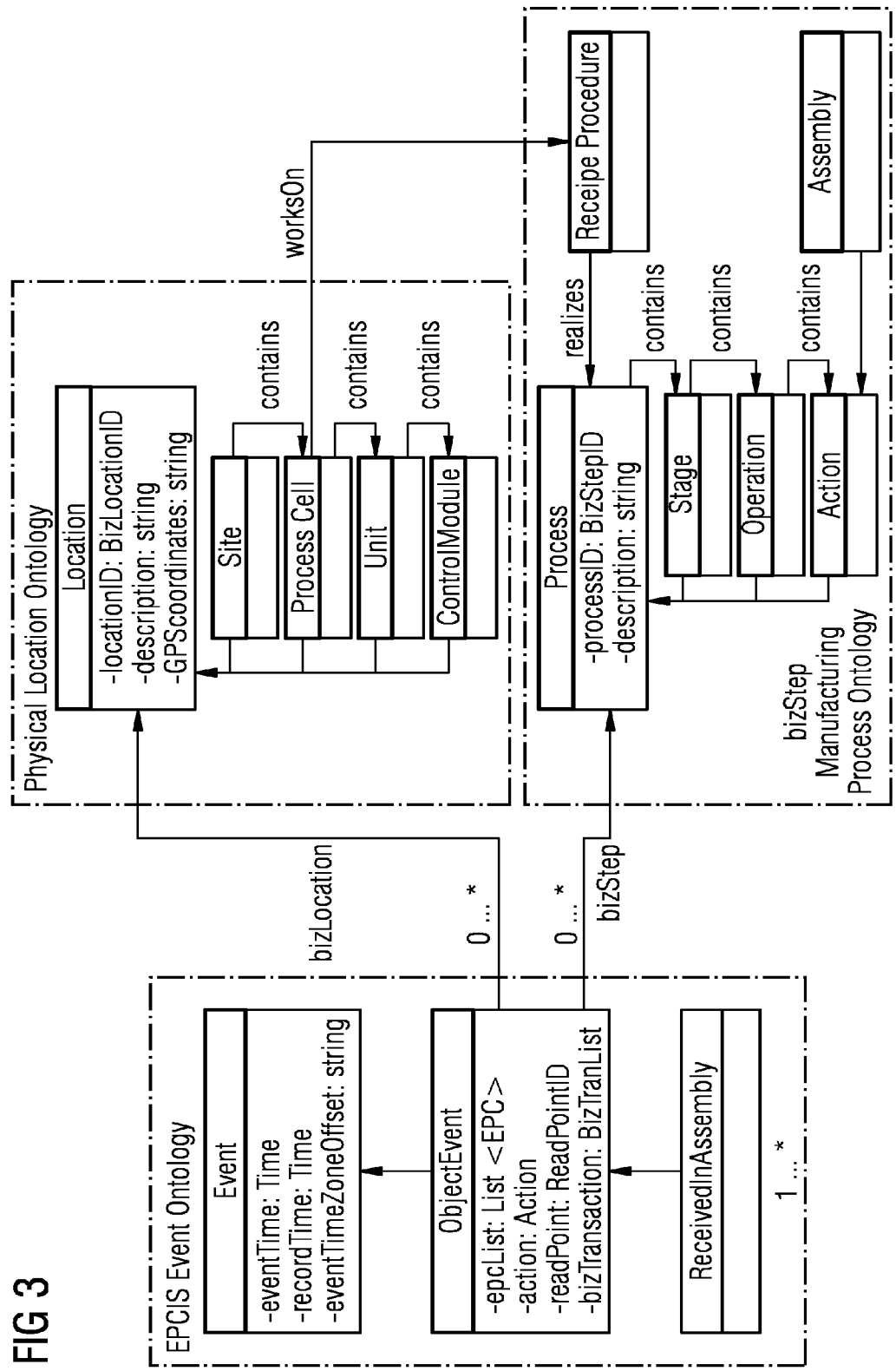
FIG. 3 is an illustration of an excerpt from the EPCIS Event and Master Data Ontologies (for Event Fields bizStep and bizLocation based on IEC 61512 and IEC 62264)

FIG. 1 shows in the intersection of a supply management according to the EPCIS standard [4] and of a production operations management according to ISA95/88 [1], [2] the location of the proposed method for an event-based reactive production order optimization. The proposed architecture seamlessly integrates cross-company tracking and tracing functionality with a company's manufacturing operations management. For enabling short-term reactions on critical disruptions a manufacturing execution system is extended with an EPCIS-compliant event processing mechanisms that supports identification of critical situations in the supply chain and triggers appropriate production rescheduling.

1. The overall system architecture is shown in FIG. 2. The overall architecture contains:

a central component used by several companies along the supply chain to exchange object tracking information; and i) a set of distributed components relying on this information.

The latter implements applications for monitoring and optimizing a company's processes.

Object tracking information collected along the supply chain can be used to optimize production schedules within a company. As tracking & tracing of objects has to be realized across several companies, the system architecture is based on the industry standard EPC Information Services EPCIS, EPCglobal, 2007 [4]. The standard provides data element specifications, interface definitions and an event mechanism. The architecture proposed in the following builds on the EPCIS standard interfaces as well as data elements and shows how an EPCIS repository can be integrated within the MES layer as introduced in IEC 62264 [2].

The conceptual architecture of the system according to FIG. 2 and the corresponding components are described below.

1.1 The EPCIS repository is now described.

The EPCIS Repository is responsible for storing EPCIS events and master data to be shared among the participating companies. Apart from some extensions in the event specification the solution relies on standard EPCIS repositories as e.g. IBM's Info-Sphere Traceability Server, SAP object event repository or the open source tool Fosstrak. The EPCIS Repository contains the EPCIS Query and Capture Interfaces. A more general and not standardized embodiment of an EPCIS Repository is a (logistic) Tracking and Tracing System.

1.2 The extended manufacturing execution system is now described.

The planning and execution of the manufacturing processes is realized by a manufacturing execution system MES. According to IEC 62264 [2], [3] a MES may comprise functions such as production execution, material management, production dispatching, production tracking, production resource management, and detailed production scheduling. An existing MES provides these functions and primarily focus on the detailed production scheduling component and its integration into an inter-organizational tracking & tracing system. This integration is realized by augmenting an existing Production Management System with a complex event processor engine as well as a component for optimizing detailed production schedules. Subsequently, the functions of the three MES components production management system, event processor and production scheduler are described.

1.3 The production management system is now described.

The Production Management System contains the basic functionality of a MES. In particular, it contains components for production execution, production tracking and monitoring, production dispatching, production resource management, and product definition management. Within our architecture the production management system is thus responsible for:

i) verification of the availability of required resources such as vendor parts, machines, or workers, ii dispatching and executing orders by interacting with the process control level, iii) tracking the current status of production jobs, and
iv) reporting of the production order status to other components (ERP, Event Processor).

The production management system receives the master production program as well as the product definitions (including bill of materials BOM) from the ERP, e.g., by means of the B2MML protocol. B2MML is a common protocol for the coupling between the Enterprise Resource Planning (ERP) and a MES according to the standard ISO/IEC 62264. The master production program as well as the product definitions are used to initialize the production scheduler which in turn provides a detailed production schedule for execution. Once a problem with the execution of a detailed production schedule is detected, a production event is triggered to the event processor.

1.4 The event processor is now described.

In order to enable the MES to issue events to the EPCIS repository as well as to react on events like delays in the supply chain or machine failures, an event processor is added to MES. To this end, the event processor implements the EPCIS capture and querying interface. The event processor formally analyzes incoming events in order to detect critical situations with respect to the current detailed production plan. Once a critical situation is observed, the event processor decides about the compensation strategies to be executed. A compensation strategy may initiate rescheduling or send an external event to the EPCIS repository. As pointed out before, the before explained functionality of an EPCIS repository is also comprised in a more general tracking and tracing system.

1.5 The production scheduler is now described.

The production scheduler is responsible for generating the detailed production plan based on a given master production program, product definitions and plant layout. The production scheduler supports the generation of an initial production schedule and also the rescheduling once disruptions in the production or logistics network occur. Rescheduling calculates the cost minimizing order of production jobs while minimizing the number of required changes in the schedule.

1.6 The enterprise resource planning is now described.

The enterprise resource planning (ERP) system deals with the order management and provides the master production program that may also contain priorities of the individual orders. These schedules specify the quantities that are needed of a certain product to fulfill demand.

In the following the focus is directed on the representation of events as well as the integration of logic-based event processing with a reactive scheduling mechanism.

2. The event and master data representation is now described.

Before discussing the functionality of the event processor and production scheduler, the event and master data representation used within the system is explained. The inter-organizational data exchange is based on the EPCIS standard. The contribution of this section is twofold:

i) The EPCIS event vocabulary is extended for expressing confirmation of plans as well as deviation from plans. This extension enables communication of problems and ad-hoc changes along the supply chain in order to reduce uncertainties.

(ii) The XML-based EPCIS event syntax is grounded with a formal semantics. By inferring implicit knowledge from given events the specification of situations and compensation strategies can be realized in a much more concise way.

2.1 The EPCIS events and extensions are now described.

The EPCIS standard defines a XML-based specification of master and event data. According to EPCglobal (2007), event data is generated during the execution of business transactions and thus grows over time. Within event definitions references can be made to master data elements which are not tied to moments in time.

Generally, all EPCIS events mandatorily have an event type and at least one named event field. The most general event type is an EPCISEvent with the mandatory event field eventTime. The other standard event types (i.e. ObjectEvent, Aggregation Event, Transaction Event and QuantityEvent) are derived from this generic base class. An ObjectEvent represents an event that happened to one or more physical objects each represented by a unique identifier. In the EPCIS standard physical objects are represented by the electronic product code (EPC) defined in the EPC tag data standard (EPCglobal, 2008) (alternatively other standards such as the data universal numbering system (DUNS) can be used). The event can be used to indicate that the objects with given EPCs have been observed at a certain location (bizLocation), within a certain business step (bizStep), business transaction (businessTransaction) or status (disposition). For a detailed discussion of the other event types and event reference is made to the EPCIS specification EPCglobal, 2007 [4].

As event types allow the observation of actions that are performed with an object, in the following they are denoted as observation events. Besides observation events, interpretation events—currently not covered by the EPCIS standard—are required for communicating deviations between actual and planned processes along the supply chain. This is important since deviations are not necessarily detected by the company which is interested in a deviation and revealing detailed plans to other companies is usually not desired. In order to enable the standard for expressing interpretation events while minimizing the required extensions, we suggest to add two new actions, namely DEVIATION and CONFIRM, to the existing types of actions ADD, OBSERVE, and DELETE. In contrast to the action OBSERVE which denotes observation events, a DEVIATION implies that an unexpected event has been observed. Events with the action CONFIRM refer to situations where events are received exactly according to the plan. The proposed current extension allows for confirming plans and for communicating deviations from plan with respect to the time of observation, the quantities involved, the observed quality of an object, and the location of an observation. The conditions under which interpretation events are communicated between companies are usually regulated in bilateral contracts between the involved companies. Timely communication of plan deviations along the supply chain may reduce negative impacts.

2.2 The formal semantics of EPCIS events are now described.

The EPCIS specification [4] defines how event and master data is represented using a XML-based syntax. The meaning of vocabulary terms is defined informally using natural language. While the XML syntax is sufficient for standardized information exchange between companies, the lack of formal semantics obstructs the automated interpretation and analysis of the events. For example, the system has to know the hierarchical relation between "tardiness" and "deviation from plan" (tardiness implies a deviation from plan) to infer that all general reactions to deviations have to be applied also to tardiness situations. Ontologies (Guarino, 1995) provide such a formal language for specifying logical relations between terms which are typically subsets of first order logics. FIG. 3 shows an excerpt from the EPCIS event ontology. To exemplify how master data ontologies can be referenced within the event definitions the physical location and manufacturing process ontologies derived from IEC 61512/62264 [2] is used.

Generally, logical predicates are used in an ontology to express classes (predicates of arity one) as well as relations between classes (predicates of arity two). Ontology assertions thus take the form C(x) or R(x,y), where C denotes a class, R a relation, and the terms x,y represent concrete objects. Consequently, classes represent event types whereas properties represent event fields as shown in FIG. 3. For example, the assertions ObjectEvent(e1), Assembly(p1) and bizStep(e1, p1) express that we observed an EPCIS ObjectEvent e1 within the bizStep p1 which is of type Assembly. The quantifiers $\forall$, $\exists$ and logical connectives such as $\vee$, $\wedge$, $\rightarrow$, etc. can be used to form complex class descriptions from atomic ones. For example, the fact that every individual that is an ObjectEvent and has a bizStep belonging to the class assembly is also an event of class ReceivedInAssembly can be expressed via the following formula:←

ReceivedInAssembly(x)ObjectEvent(x)$\wedge\exists$y·((Assembly(y)$\wedge$bizStep(x,y)).

New incoming ObjectEvents x which meet this formula are automatically classified as ReceivedInAssembly events without explicitly stating the corresponding assertion. All situation recognition and compensation handling rules defined for ReceivedInAssembly events are thus automatically applied to the new events. The EPCIS event ontology thereby reduces the number of rules required for situation recognition and compensation strategies, simplifies their specification at design time, and additionally supports logical consistency checks.

3. The event processor is now described.

Figure 4:
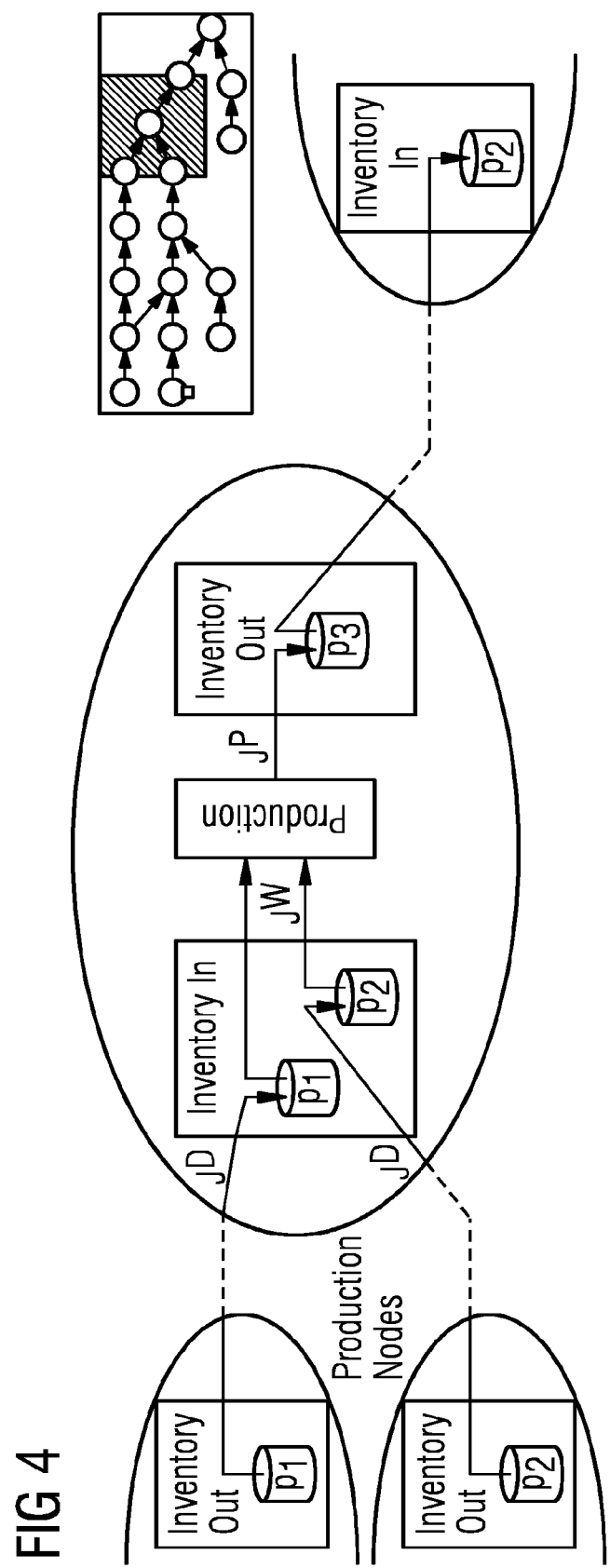
FIG. 4 is an illustration of an I/O of an event processor.

The goal of the event processing component is to dynamically recognize situations—in particular critical situations—based on a stream of time-stamped events, the current production schedule and expected stock levels. As a result the event processing component initiates appropriate counter actions which include rescheduling and issuing new external events to the EPCIS repository. As shown in FIG. 4, the event processor can be split into three subcomponents 3.1 Registration, 3.2 Situation recognition, and 3.3 Compensation Handling described in the following.

3.1 Registration is now described.

The Registration component analyzes the detailed production plan received by the scheduler in order to subscribe for relevant events and update the current plan data in the situation recognition component. The detailed production plan specifies the resources (i.e. material and end products) required at a given point in time. Let the production plan R $\subseteq$ P×M× $\mathbb{R}$ ×T be the set of tuples (p, m, q, t) describing the material consumption with p$\in$P representing the material identifier according to the BOM, m$\in$M representing the machine identifier or location, and q$\in \mathbb{R}$ denoting the quantity of resource p that is required at time t$\in$T. Algorithm 1 in table 1 describes how queries are subscribed to the eventing mechanisms of the EPCIS repository and how the required resource availabilities are provided to the situation recognition component. Throughout the paper we apply a notion from object-oriented programming to refer to elements of a vector. E.g. we refer to the components a of a vector x$\in$X={(a, b, c)a$\in$A$\wedge$ b$\in$B $\wedge$ c$\in$C} by the expression x.a.

TABLE 1

Algorithm 1
Algorithm 1. Procedure to register for relevant
EPCIS events and update availability plans. Require:
resource consumption plan R, observation list L 1: for all r $\in$ R do
2:   EPC/EPCClassID e = lookupEPC(r.p)
3:   add ObjectEvent(e, r.t, r.m,• ,• , "REQUIRED",•)
4:   if e $\notin$ L then
5:     if e type EPC then
6:       register SimpleEventQuery {MATCH_anyEPC(e)}
7:     if e type EPCClassID then
8:       register SimpleEventQuery {MATCH_EPCClass(e)}
9:     L = L $\cup$ {e}.

Procedure to register for relevant EPCIS events and update availability plans. Require: resource consumption plan R, observation list L.

The algorithm keeps an observation list L that stores the EPCs or EPCClassIDs of the resources that are already registered. A crucial function for integrating logistics information into production processes is the mapping of the internal identifier used for the different resource classes in the manufacturing bill of material description (MBOM) to the external identifiers used within the EPCIS tracking and tracing system. The mapping is realized in line of Algorithm 1 using the lookupEPC-method. While in the production environment a class-based identification of materials to retain flexibility of production is used, for tracking & tracing item-based identification is often necessary (especially in case of JIT/JIS processes). Different implementations of the lookupEPC-method can be used to cover the various settings. The difference between internal and external identifiers can be addressed by defining explicit mappings of EPCClass/EPC identifiers to MBOM (class) identifiers. Based on the structure of the identifier, in many cases the class identifier can be derived directly from the item identifier, e.g. the EPC class urn:epc:idpat:sgtin:0614141.112345.* of the item with EPC
    urn:epc:idpat:sgtin:0614141.112345.400
is defined by the first part of the EPC code.

Once the external EPC or EPCClass is identified, the algorithm verifies if a corresponding callback query is already registered with the EPCIS repository (line 4). If this is not the case, a new query is registered (line 6 and 8). The EPCIS standard provides a set of predefined queries (SimpleEventQueries) which have to be implemented by all EPCIS repositories. For details refer to Section 8.2.7.1 of EPCglobal (2007). As situation recognition often requires to compare the actual with the expected process behavior, plans about material availability have to be updated. Such updates can be represented locally by adding an ObjectEvent with the Action "REQUIRED" to the ontology (line 3). Since this action is only used with the Event Processor, it has not to be part of the inter-organizational standard. For a given r$\in$R the event specifies the time r.t when material r.p has to be available at location r.m. For the sake of compactness, we use the following abbreviation to refer to an ObjectEvent within the EPCIS Event Ontology:

a) ObjectEvent(e,t,l,s,b,a,d) $\Leftrightarrow$ ObjectEvent(e)$\wedge$ timestamp (e,t)$\wedge$ location(e,l)$\wedge$ bizStep(e,s)$\wedge$ businessTransaction(e, b)$\wedge$ action(e,a)$\wedge$ disposition(e, d).

While identifier e and timestamp t are mandatory for all event types, all other relations are optional. Properties that are not defined are indicated by ".".

3.2 The situation recognition is now described.

Complex situations like early or late arrival of vendor parts, machine breakdowns, or other disruptions can be described based on a set of observed events. In line with most approaches in the area of complex event processing, each situation is defined by specifying the interdependency between events using event patterns. Event patterns can be seen as templates which match certain combinations of events. In literature, a wide range of different event pattern languages have been proposed. Here on a rule-based event pattern language is relied on. A rule-based approach has the advantage to integrate the logical formalism for reasoning over event hierarchies introduced in the previous section with the additional language constructs and temporal reasoning methods provided by an event pattern language.

In the following, on the event pattern definition defined by Anicic et al. [6] is relied on. An event pattern is constructed from atomic or complex events and extends the presented logical formalism as follows:

$$a) P ::= pr(t_1, \ldots, t_n) | P \text{ WHERE } t | q | (P) \cdot q | P \text{ BIN } P | \text{NOT}(P) \cdot [P,P] \tag{1}$$

pr represents a n-array predicate with arbitrary terms $t_1, \ldots, t_n$, q∈R is a nonnegative rational number, WHERE can be used to define constraints using a term t, and BIN is a binary operator that refers to one of the temporal relations defined by Allen (1983) [7]. These temporal operators include SEQ representing a sequence of events, AND indicating that two events happen at the same point in time, and OR specifying that at least one of two events have to occur. In our case pr mostly adopts an (atomic) EPCIS event such as an Object-Event. Note that situations are treated again as complex events, i.e. $pr(t_1, \ldots, t_n)$ p.

Generally, in case of distributed production networks one can distinguish between three types of detecting deviations:
i) The deviations is detected by comparing the actual material flow tracked by the EPCIS repository with the companies' local plans,
ii) the company receives a deviation notification via an EPCIS interpretation event or
iii) actual object tracking information from the EPCIS repository is locally compared to expected material flow information determined by prognosis algorithms.

The three approaches are exemplified using the following three simple event patterns, rule (2) to rule (4). They determine whether incoming material or outgoing products with a unique identifier e are delayed according to the planned availabilities and delivery deadlines.

| | | |
|---|---|---|
| a) | ActualDelay(e) ∧ delay(e, $t_2$, $t_1$) ← | |
| i) | (ObjectEvent(e, $t_2$, I,•,•, "REQUIRED",•) SEQ | |
| ii) | ObjectEvent(e, $t_1$, I,•,•,$^i$ 'OBSERVE',•)) | (2) |
| b) | NotifiedDelay(e) ∧ delay(e,$t_2$, $t_1$) ← | |
| i) | (ObjectEvent(e, $t_2$, I,•,•, "REQUIRED",•) SEQ | |
| ii) | ObjectEvent(e, $t_1$, I,•,•,$^i$ 'DEVIATION',•)) | (3) |
| c) | ExpectedDelay(e) ∧ delay(e, $t_2$, t) ← | |
| i) | (ObjectEvent(e, $t_2$, $I_2$,•,•, "REQUIRED",•) ∧ | |
| ii) | ObjectEvent(e, $t_1$, $I_1$,•,•,'OBSERVED',•) ∧ | |
| iii) | deliveryEstimation($t_3$, $I_1$, $I_2$) ∧ t = $t_1$ + $t_3$) | |
| iv) | WHERE $t_2$ < $t_1$ + $t_3$ | (4). |

Rule 2 implements the first approach by comparing the time $t_1$ an object has been observed at a given location I with the time $t_2$ the object is required at the location according to the production plan. However, usually it is too late for an appropriate reaction if we detect a delay once the delivery is already received. The cross-organizational tracking and tracing system gives two alternatives for an earlier detection. Rule 3 replaces the actual observation through a deviation event and thus implements the second approach. Rule 4 finally leverages the rich set of historic tracking and tracing data from the EPCIS repository to calculate the approximate delivery time based on the currently available observations. In the example, the prognosis function $$deliveryEstimation: L \times L \to T$$

allows the estimation of the arrival time t∈T based on the current position and destination of a certain good/source material. Possible implementations of this function range from simply using the mean delivery durations of previous orders to more sophisticated predictions models utilizing support vector machines, neural networks or simulation models.

Generally, time delays in supply chains are only one type of situations that are of interest for production planning and control. However, as the presented EPCIS event representation and pattern language is very expressive, other critical situations such as quality deviations, misroutings, etc. can similarly be detected. Further, by leveraging the formal semantics of events the consistency of situation definitions can be verified. The before mentioned functions (2), (3) and (4) influence e.g. a transportation time or a delivery time.

3.3 The compensation handling is now described.

Once a critical situation has been detected, notifications and—if possible—compensation measures should be initiated. Therefore, at design time a set of compensation strategies (see FIG. 4) have to be defined. These compensation strategies can be realized by using the presented rule mechanism. The compensation rules have the form comp←P where P is a situation description according to definition (1) and comp one or a conjunction of the rule engine's built-in predicates. As the number of compensation rules can easily exceed several thousands, a compact and concise language is required. Our logic-based model supports this requirement as event hierarchies can be used to define rules on different levels of abstraction which reduces the number of required rules. In addition, the underlying formal model can be leveraged for consistency checking of the compensation strategies.

As an example a compensation handling strategy for detected delays in the supply chain is assumed. The logical inference mechanism automatically provides the knowledge that the situations ActualDelay, NotifiedDelay, and ExpectedDelay detected in the situation recognition component are all subclasses of the situation delay. This is guaranteed by the following definition: Delay(x)←ObjectEvent(x)∧ delay(x, y).

Based on this definition a general (and extremely simple) compensation rule for all kinds of delays can be defined.

| | |
|---|---|
| notifyScheduler('time',p,t1,t2) ← | delay (e,t1,t2) ∧ lookupEPC$^{-1}$(e, p) (5) |

Once a delay is detected, the rule triggers the builtin predicate notifyScheduler that invokes the update method of the production scheduler. This method currently supports updates of material availability in terms of 'time' as well as 'quantity' and a change of the production 'duedate' of a product. For notification of delays the predicate additionally takes the material identifier p (according to MBOM), the expected time $t_1$, and the observed/estimated time $t_2$. To map the external EPCIS identifier e to the internal MBOM identifier p the inverse lookupEPC$^{-1}$ of the lookupEPC-method introduced in the previous paragraphs is used.

4. The reactive production scheduling is now described.

As discussed before, the production scheduler is responsible for calculating the detailed production schedule. In this context, two different aspects have to be taken into account.

On the one hand, the decision which task should be executed by a specific machine (detailed machine scheduling) and, on the other hand, the material supply (inventory-oriented scheduling). As the latter is susceptible to logistics events (particularly in JIT/JIS settings), the focus is directed on the impact of EPCIS events on inventory-oriented scheduling. Detailed machine scheduling with change over times can be integrated into the model.

4.1 The reactive scheduling algorithm is now described.

Figure 5:
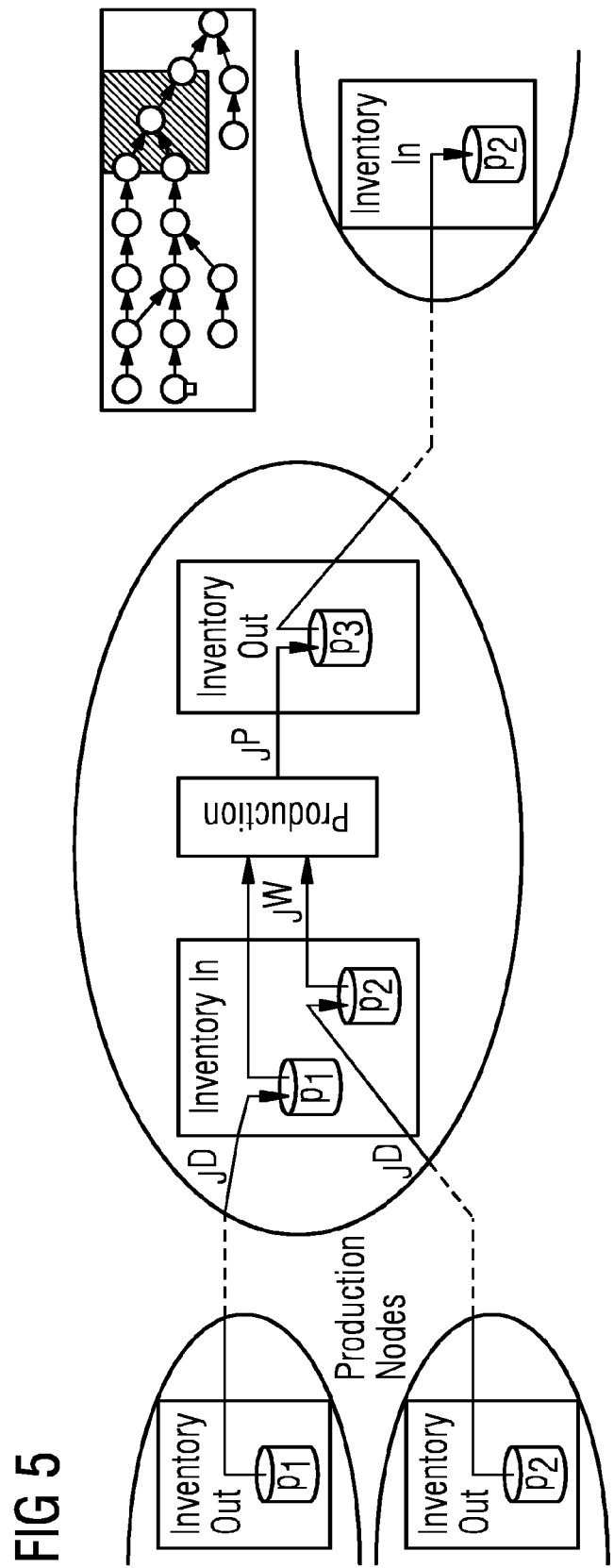
FIG. 5 is a graphical representation of the inventory model embedded into a production network.

The goal of the presented reactive production scheduling approach is to calculate the cost minimizing sequence of production jobs $J^P$ each time the event processor updates delivery plans or production deadlines. Production jobs require a set of withdrawal jobs $J^W$ from the inventory. Inventories are replenished by the delivery jobs $J^D$. The dependencies are depicted in FIG. 5 and discussed in the following.

Production jobs $J^P$:

A production job $j \in J^P$ is a 3-tuple $j=(p, d, s)$ where $p \in P$ represents the MBOM material class identifier of the end product and $d \in \mathbb{N}$ the due date which are both derived from the production orders received via the production manager. The optimal starting time $s \in \mathbb{N}$ of the production job is calculated by the production scheduler. Once the notifyScheduler ('duedate', p, t1, t2) method is called by the event processor production jobs are updated as follows:

$$J^P = J^P \setminus (p, t1, s) \text{ and } J^P = J^P \cup (p, t2, s).$$

Generally, updates trigger the rescheduling algorithm below.

Delivery Job $J^D$:

Each production job requires a (nonempty) set of components from the inventory. Production scheduling thus requires information about material deliveries $J^D$. It is described by tuples $m=(p, q, t)$ where $p \in P$ is a MBOM identifier, $q \in \mathbb{N}$ the quantity and $t \in \mathbb{N}$ the time of delivery. During scheduling the set of delivery jobs $J^D$ is used to verify whether a set of withdrawal jobs is possible at a given point in time. The set of delivery jobs is updated by the methods notifyScheduler ('quantity', p, t1, t2) and notifyScheduler('time', p, t1, t2) as done for the production jobs above.

Withdrawal Jobs $J^W$:

The withdrawal jobs that are required for a certain (syn. specific) production job can be determined by the function mbom: $P \rightarrow 2^{P \times \mathbb{Z}^-}$ which specifies the quantity of each material required for a specific product. The entire set of withdrawal jobs for product $p_{end} \in P$ is given by JW $p_{end} = \{(p, q, t) | (p, q) \ 2 \ \text{mbom}(p_{end}) \wedge t \in \mathbb{N}\}$ where t defines the withdrawal time of material for product $j_{end}$ and depends on the schedule of production jobs, see formula (8). According to the notation given to the production jobs a withdrawal job $w \in J^W$ is an element of a set of withdrawal jobs $J^W$.

Rescheduling Algorithm:

The algorithm aims at calculating an optimal schedule of the production jobs contained in $J^P$, i.e. a schedule defines the starting point j.s for all $j \in J^P$. A schedule is thus a total function $\sigma: J^P \rightarrow \mathbb{N}$ N assigning a starting time to each job. The objective of choosing the function $\sigma$ is the minimization of a cost function, e.g. the earliness/tardiness given by the distance to the due date $|\sigma(j) - j \cdot d|$. However, in the context of rescheduling changing the schedule $\sigma_{old}$ should only be done if there is a significant improvement. To quantify the improvement, additionally the distance between the optimal and the current schedule is calculated using a distance function edit. This function has to be chosen depending on the inventory system. For example, considering a high rack warehouse arbitrary substitutions between productions jobs are possible. In this case edit is implemented using the Hamming Distance (Hamming, 1950). Consequently, the optimization problem for selecting the best schedule can be formulated as follows where $w \in [0, 1]$ represents the "rescheduling threshold" ($w=1$ always chooses the optimal schedule whereas $w=0$ leads to the schedule with minimal changes). Note that in some cases normalization of $|\sigma(j) - j \cdot d|$ and edit could be required.

$$\operatorname*{argmin}_{\sigma: J^P \rightarrow \mathbb{N}} w \cdot \sum_{j \in J^P} |\sigma(j) - j \cdot d| + (1-w) \cdot \text{edit}(\sigma, \sigma_{old}) \quad (6)$$

In order to make sure that no production jobs are scheduled without having enough stocks, see formula (7), enough time to transport components from the inventory to the machines, see formula (8), and enough production capacity, see formula (9) the following constraints have to hold. The function prep defines the transportation time for given withdrawal and production jobs. The constant PROD_CAPACITY defines how many production jobs can be executed in parallel.

$$\forall t \in \mathbb{N}, \forall p \in P: \sum_{i=0} \sum_{j \in JD \cup J_p^W \wedge j.t=t \wedge j.p=p} j.p \geq 0 \quad (7)$$

$$\forall j \in J^P, \forall j' \in J_j^W p.j' \cdot t - \text{prep}(j',j) = j \cdot s \quad (8)$$

$$\forall t \in T: |\{j \in J^P | j \cdot s = t\}| \leq \text{PROD\_CAPACITY} \quad (9)$$

The optimization problem can be represented as a mixed integer linear program with a totally unimodular constraint matrix. Thus, the problem can be efficiently solved using the simplex algorithm. Capacity/production capacity, transportation time and performance are herewith summarized under the term process parameter.

4.2 The evaluation results are now described.

In order to investigate the impact of the event-based scheduling strategy on the performance of production, simulations are used to measure earliness/tardiness of jobs and required rescheduling steps. We simulated a production line for manufacturing with two product types each requiring two different vendors parts from the inventory. Up to 30% of the expected material deliveries are delayed. The corresponding EPCIS ObjectEvents notifying about the delay are generated randomly; actual delays are derived using Rule 3. Production of both products takes one time slot and the line processes a single order at a time (PROD CAPACITY=1). A simulation run contains 10 schedules with together 200 discrete time slots. Before production start of a schedule, we assume that production jobs can be shifted without restrictions. Hence, distance between two schedules is measured using the Hamming Distance. The simulation has been done for three different strategies:

Shifting Strategy:

Baseline scenario where EPCIS Events are not considered. Once an order cannot be executed due to missing vendor parts, it is shifted to the end of the schedule or (if necessary) to the next schedule.

Scheduling Strategy:

Once an EPCIS event is received from the Event Processor, a new optimal schedule that minimizes the distance to the due date $|\sigma(j) - j \cdot d|$ for all $j \in J^P$ is calculated. This corresponds to rescheduling with Formula (6) and $w=1$.

Rescheduling Strategy (w=0.5):

The rescheduling strategy additionally considers the trade-off between the number of reschedule steps required and the optimality of the schedule. For the simulation runs w=0.5 has been used.

Figure 6:
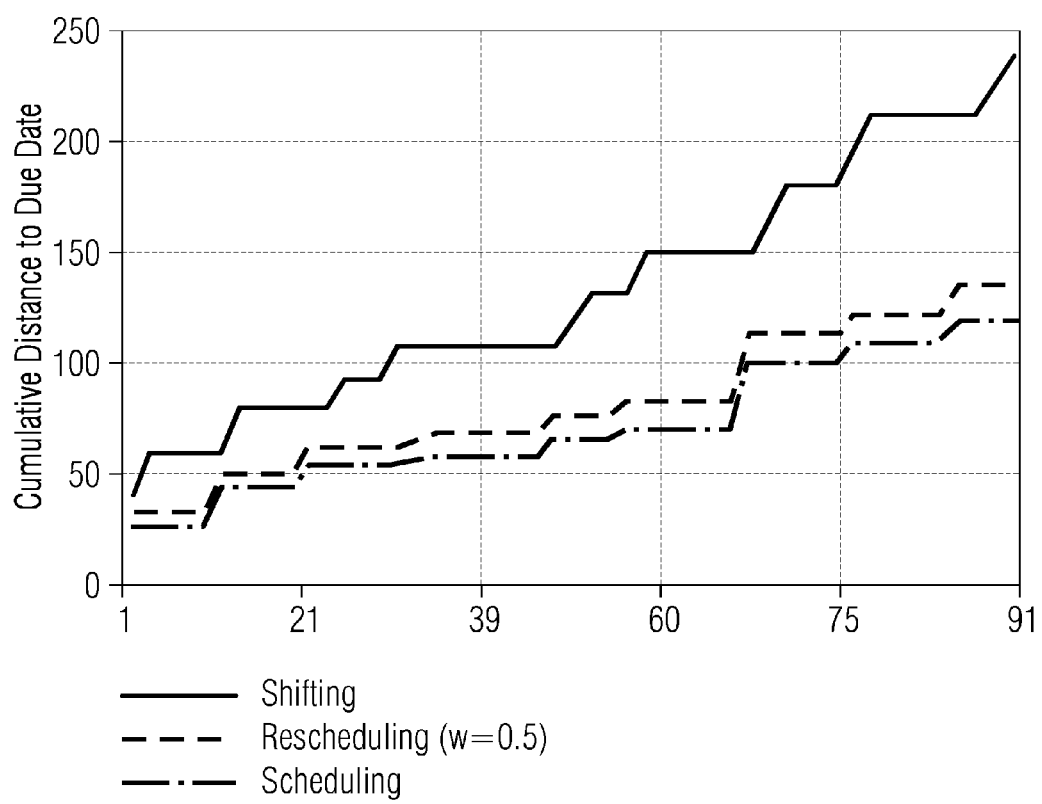
FIG. 6 is a graph showing an impact of the scheduling strategy on the deviation from the optimal due date.
Figure 7:
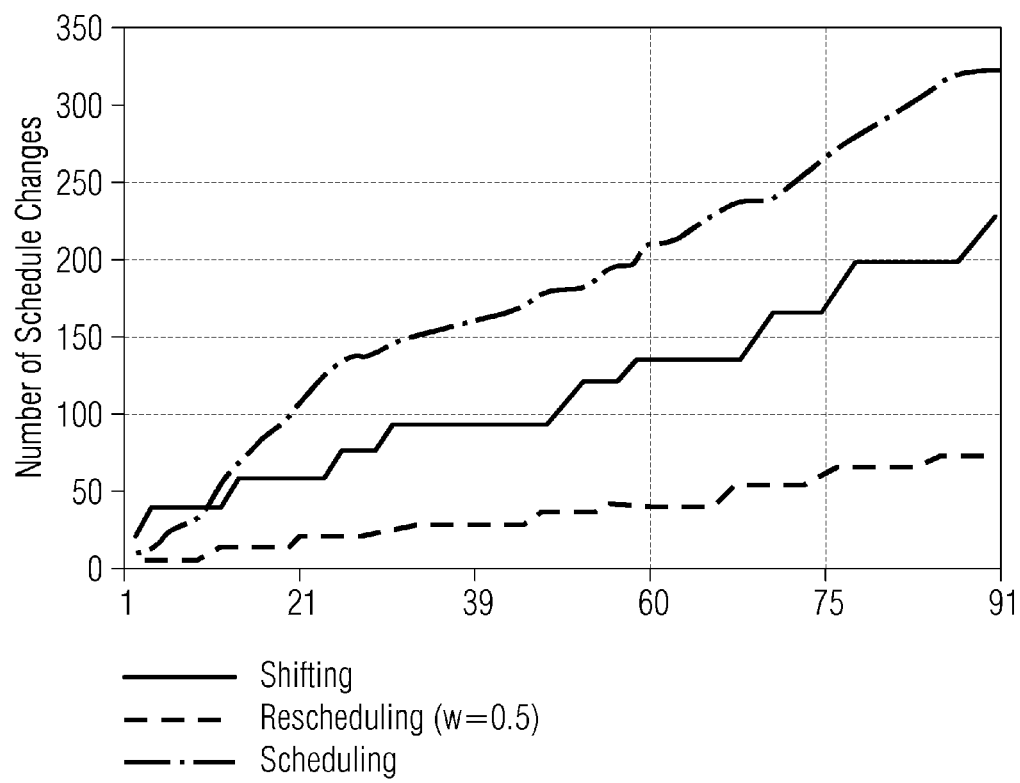
FIG. 7 is a graph showing a number of changes to the schedule required for each scheduling strategy.
Figure 8:
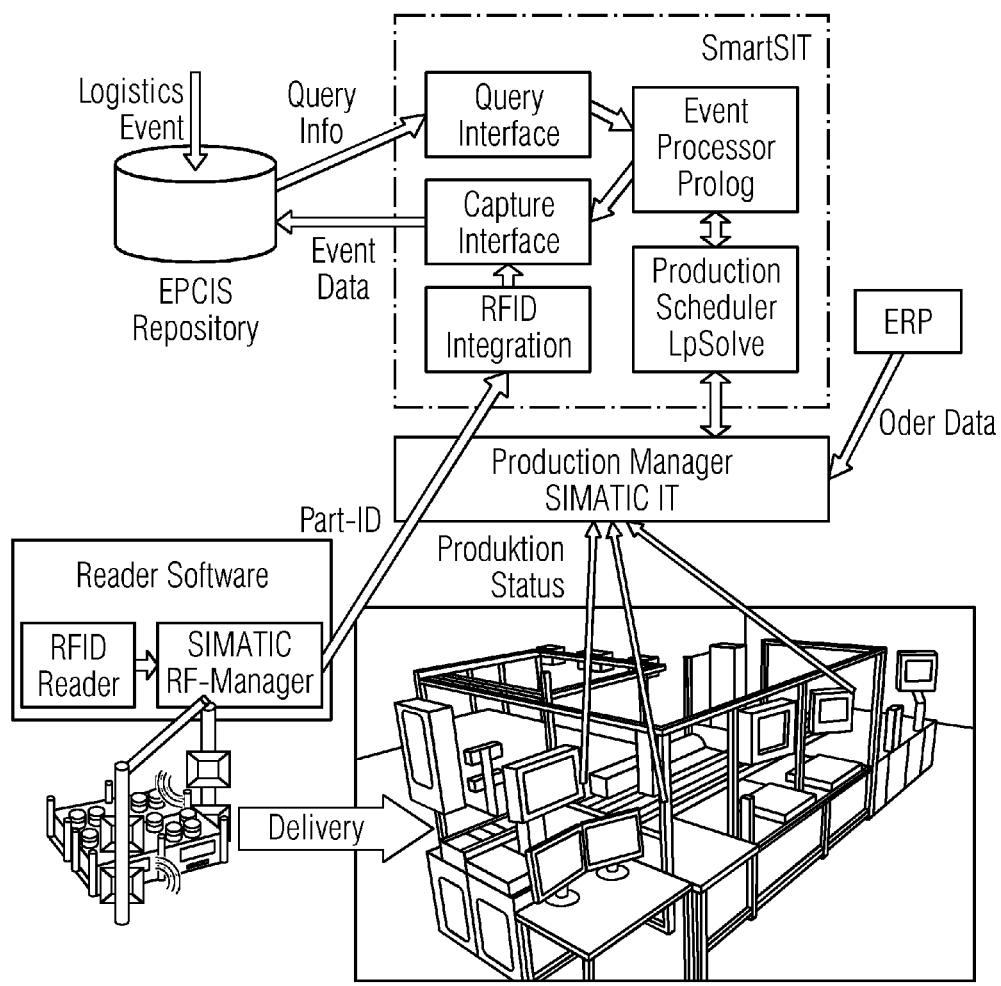
FIG. 8 is an illustration of a demonstrator.

FIG. 6 shows the absolute cumulated distance to the due date for the 91 of the 200 simulation runs that resulted in schedule changes. Selecting always the optimal schedule (scheduling strategy) reduces the cumulated earliness/tardiness by 50% compared to the baseline strategy. The rescheduling strategy improves the cumulated earliness/tardiness only by 43%, but requires only a small share of rescheduling steps compared to the optimal scheduling strategy. The number of required changes in the schedule are shown in FIG. 7. In the simulation, moving from optimal scheduling to the rescheduling algorithm reduces the number of rescheduled steps by 78%, while the performance only reduces by 7%. The simulations therefore indicate that considering the trade-off between performance improvement and number of rescheduling steps is essential, particularly in scenarios where manual work is required for implementing changes to the schedules.

5. The reference implementation is now described.

A first proof of concept of this system is realized based on the Siemens SmartAutomation lab. The SmartAutomation lab is an industrial research plant for practical testing of new technologies, products and automation solutions. The lab consists of two parts one in Karlsruhe, which is related to process industry and one part in Nuremberg for discrete manufacturing purposes. Both labs allow the evaluation of new methods for development, specification and commissioning in a real plant under real conditions. They are reduced in dimension, e.g. smaller conveyor belts, but built with real state of the art automation systems and software to give a good base for further evaluation, testing and prototyping.

The basis of the implementation is the Siemens MES system SIMATIC IT which provides the functions of the production management system as introduced in Section 3. As part of the evaluation SIMATIC IT is extended by the component SmartSIT for handling EPCIS events. In order to be able to "include" the components event processor and production scheduler SIMATIC IT is extended by connectors to the EPCIS repository and RFID reader infrastructure. The event processor is implemented using the Prolog rule engine and the ETALIS language for events, see http://code.google.com/p/etalis. The prototype of the Production Scheduler is currently realized using the mixed integer linear programming solver lpsolve, see http://lpsolve.sourceforge.net.

For handling and configuration purposes of the installed RFID infrastructure the SIMATIC RFManager is used. SIMATIC RF-Manager is also responsible for providing reader events by sending ecReports to SmartSIT through its ALE protocol as specified in EPCglobal (2005).

By means of the SmartSIT component, production scheduling and dispatching of production jobs in SIMATIC IT can be done under consideration of information from the logistics network. For example, material that will shortly arrive in the commissioning station can already be considered in the planning process or product requests of a high priority customer can be served at short notice.

Figure 9:
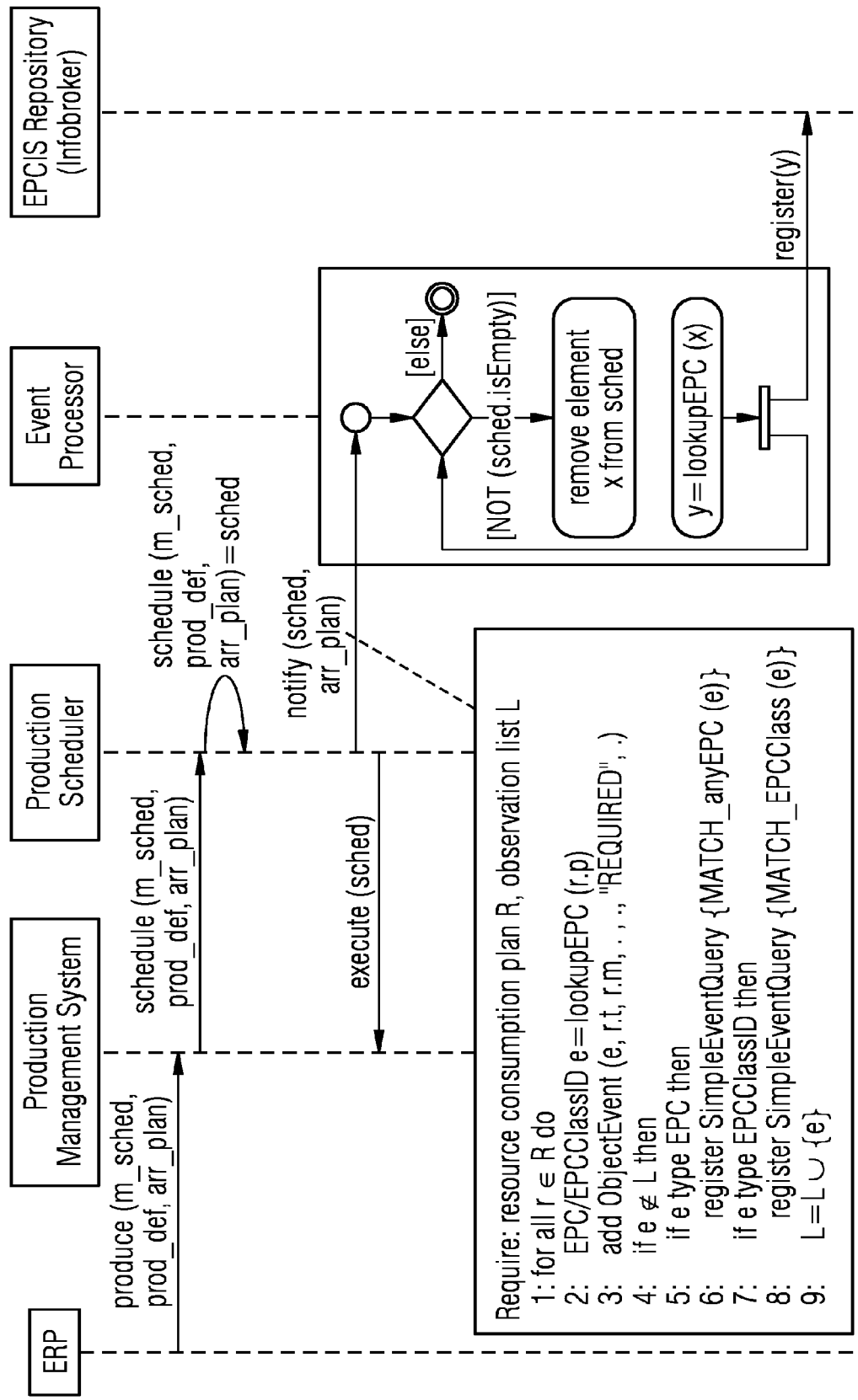
FIG. 9 is an illustration of a normal situation: from the ERP an order to the MES is given.

FIG. 9 depicts the normal situation: From the ERP an order to the MES is given. In FIG. 9 the MES contains the three components production management system, production scheduler and event processor as in detail explained under section 1.2. The event m_sched (master schedule) describes which product type has to be produced until a given due date.

Consequently, it is a list of production jobs, which are tuples (p,d) where p is a product id and d is the due date.

prod_def (product definitions): defines the production process of a specific product type containing also which source material is required.

arr_plan (arrival plan) describes when the delivery of source material is expected/planned. It is a set of triples (p,q,t) which denotes that an amount q of a product id p will arrive at time t.

The schedule sched (schedule) describes for each production job in m_sched, when which material is taken from inventory and when the product will be finished.

Figure 10:
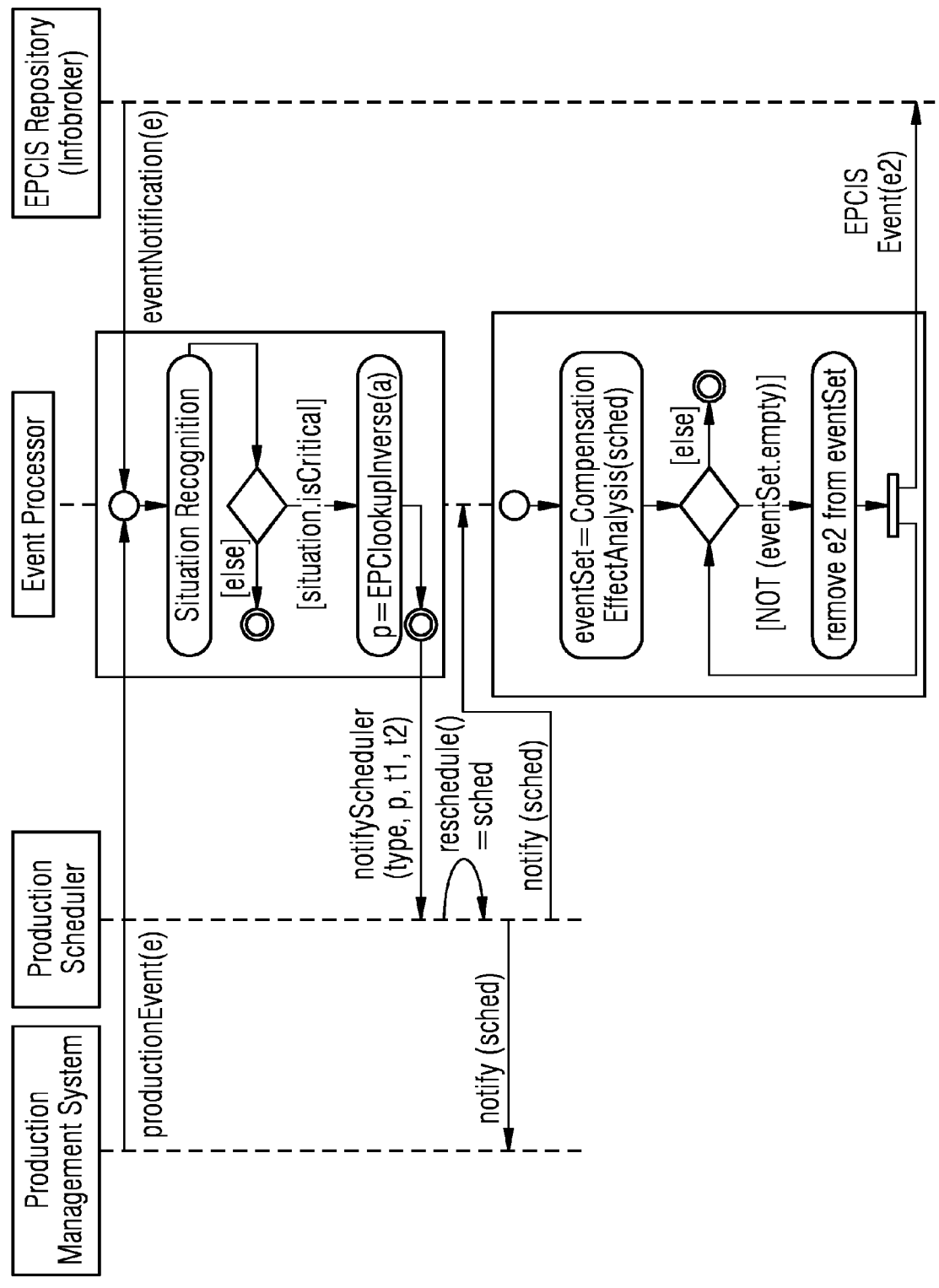
FIG. 10 is an illustration of a case of a deviation in which a notification from the EPCIS Repository occurred by a EPCIS Event.

FIG. 10 describes the situation, in which a notification from the EPCIS

Repository occurred by an EPCIS Event:

e: event about previously registered epc object eventNotification(e) or information about production productionEvent(e). The described activities start if one of the before cited events arrive.

The event notifyScheduler(type,p,t1,t2) has the following parameters: type: defines the type of deviation detected by the situation recognition of the event processor, as e.g. TIME, QUANTITY, DUEDATE;

p: material identifier in accordance to MBOM;

t1,t2: expected time t1 and served/estimated time t2.

List of used identifiers and variables:

arr_plan (arrival plan):

describes when the delivery of source material is expected/planned, a set of triples (p,q,t)

d due date e event about previously registered epc object [eventNotification(e)] or information about production [productionEvent(e)]

$J^D$ delivery jobs, set of delivery jobs $J^P$ production jobs, set of production jobs $J^W$ withdrawal jobs, set of withdrawal jobs m_sched (master schedule $J^P$): [B2MML] describes which product type has to be produced until a given due date; list of production jobs, which are tuples (p,d)

p material identifier in accordance to MBOM; product identifier;

material class identifier

P Situation description pr n-array predicate with arbitrary terms prod_def (product definitions $J^P$): [B2MML] product definition which defines the production process of a specific product type containing also which source material is required s starting time sched (schedule):

the schedule describes for each production job in m_sched, when which material is taken from inventory and when the product will be finished type defines the type of deviation detected by the situation recognition of the event processor, as e.g. TIME, QUANTITY, DUEDATE t time, arrival time $t_1$, $t_2$ expected time $t_1$ and served/estimated time $t_2$ for delivery of source material

LIST OF USED ACRONYMS

ALE Application Level Events
B2MML Business To Manufacturing Markup Language
BOM Bill Of Materials
EPC Electronic Product Code
EPCIS Electronic Product Code Information Services ERP Enterprise Resource Planning System
ID Identification, Identity
JIS Just-In-Sequence
JIT Just-In-Time
MBOM Manufacturing Bill of Material
MES Manufacturing Execution Systems
RF Radio Frequency
RFID Radio Frequency Identification
SCM Supply Chain Management

LIST OF CITED DOCUMENTS

[1] ANSI/ISA-95.00.01-2000 Enterprise-Control System Integration Part 1: Models and Terminology
[2] IEC 62264-1 Enterprise-control system integration—Part 1: Models and terminology
[3] IEC 62264-2 Enterprise-control system integration—Part 2: Object model attributes
[4] EPC Information Services (EPCIS) Version 1.0.1 Specification Source: http://www.epcglobalinc.org; http://www.gs1.org/gsmp/kc/epcglobal/epcis
[5] Pfohl, H. C., Gallus, P., and Köhler, H. (2008). Risikomanagement in der Supply Chain—Status Quo und Herausforderungen aus Industrie-, Handels- und Dienstleisterperspektive. Technical report, TU Darmstadt.
[6] Anicic, D., Fodor, P., Rudolph, S., Stühmer, R., Stojanovic, N., and Studer, R. (2010). A rule-based language for complex event processing and reasoning. In Int. Conf. on Web Reasoning and Rule Systems. Italy.
[7] Allen, J. F. (1983). Maintaining knowledge about temporal intervals. Commun. ACM, 26(11), 832-843.
[8] Luckham and Vera, 1995

The invention claimed is:

1. A method for production management for an enterprise resource planning (ERP) system and a manufacturing execution system (MES), the MES containing a production management system, a production scheduler and an event processor, the method comprises the steps of:
a) transmitting an order from the ERP-system to the production management system, the order containing a product process, required source material, a product to be produced from the required source material and the product process, and a due date of the product;
b) transmitting a schedule to the production scheduler, the schedule containing at least the order of step a), a description indicating which source material is taken from an inventory and when the product will be finished;
c) transmitting a notification from the production scheduler to the event processor when a production job has to be completed;
d) receiving information about an expected delivery of the source material via a tracking and tracing system being an electronic product code information services (EPCIS) repository, the tracking and tracing system notifying the event processor on a observation of the source material or a deviation regarding delivery of the required source material;
e) performing, via the event processor, a situation recognition on the observation and deviation by a function which detects situations having a influence on at least one process parameter due to the deviation of the delivery of the required source material;
f) depending on the situation recognition the event processor notifies the production scheduler regarding the source material and expected time of delivery of the source material;
g) performing, via the production scheduler, a rescheduling of production jobs by optimizing process parameters and/or by minimizing a number of required changes in the schedule based on data notified in the step f) including a lack of the required source material; and performing the rescheduling step g) according to the formula:

$$\arg\min_{\sigma: J^P \to \mathbb{N}} w \cdot \sum_{j \in JP} |\sigma(j) - j \cdot d| + (1-w) \cdot \text{edit}(\sigma, \sigma_{old})$$

where:
  $\sigma$ is the schedule and is represented by a total function $\sigma: J^P \to \mathbb{N}$;
  $J^P$ are the production jobs;
  $\mathbb{N}$ is an assigned starting time for each job;
  $|\sigma(j) - j \cdot d|$ is a distance to the due date;
  $w \in [0,1]$ is a constant representing a rescheduling threshold where w=1 means always choose an optimal schedule and w=0 leads to the schedule with minimal changes;
  $\sigma_{old}$ is an old schedule;
  edit is implemented using a Hamming distance; and
h) producing a product according to the rescheduling of the production scheduler and in view of available source materials.

2. The method according to claim 1, which further comprises:
selecting the at least one process parameter from the group consisting of a transportation time, a performance and a capacity;
selecting the process parameters from the group consisting of a transportation time, a performance and a capacity; and
performing the optimizing step by taking into account incurred costs.

3. The method according to claim 1, wherein the production job j∈JP being an element of a set of productions jobs JP, the production job defined by an 3-tuple j=(p, d, s) comprising:
p material class identifier;
d due date; and
s starting time being calculated by the production scheduler;
the material delivery m∈JD being an element of a set of material deliveries, the material delivery defined by an 3-tuple m=(p, q, t) comprising:
p material class identifier;
q quantity; and
t time of delivery.

4. The method according to claim 3, wherein a withdrawal job w∈J$^W$, J$^W$ denoting a set of withdrawal jobs, a withdrawal job assigned to a specific production job j, the withdrawal job w specifying a quantity of each material required for a specific product, and wherein in step f) during scheduling the set of delivery jobs J$^D$ is used to verify whether the withdrawal job w∈J$^W$ is possible at a given point in time.

5. The method according to claim 4, wherein a rescheduling algorithm for step f), the rescheduling algorithm based on a schedule being a function σ: JP→N assigning a starting time to each production job j with a minimizing an earliness/tardiness given by a distance to the due date jσ(j)−j·d|, where j·d specifies the due date of the production job j.

6. The method according to claim 1, which further comprises notifying, via the tracking and tracing system, the event processor in step d) on the observation of the source material along a supply chain.

7. The method according to claim 1, wherein the deviation of the required source material is based on one of the following:
- a detection by comparing an actual material flow with a local plan; or
- a comparison of an actual object tracking information to an expected material flow information, the latter determined by a prognosis algorithms.

8. A system, comprising:
means for production management for an enterprise resource planning (ERP) system and a manufacturing execution system (MES), the MES containing a production management system, a production scheduler and an event processor, said means programmed to:
a) transmit an order from the ERP-system to the production management system, the order containing a product process, required source material, a product to be produced from the required source material and the product process, and a due date of the product;
b) transmit a schedule to the production scheduler, the schedule containing at least the order of step a), a description indicating which source material is taken from an inventory and when the product will be finished;
c) transmit a notification from the production scheduler to the event processor when a production job has to be completed;
d) receive information about an expected delivery of the source material via a tracking and tracing system being an electronic product code information services (EPCIS) repository, the tracking and tracing system notifying the event processor on a observation of the source material or a deviation regarding delivery of the required source material;
e) perform, via the event processor, a situation recognition on the observation and deviation by a function which detects situations having a influence on at least one process parameter due to the deviation of the delivery of the required source material;
f) depending on the situation recognition the event processor notifies the production scheduler regarding the source material and expected time of delivery of the source material;
g) perform, via the production scheduler, a rescheduling of production jobs by optimizing process parameters and/or by minimizing a number of required changes in the schedule based on the data notified in step f) including a lack of the required source material; and performing the rescheduling step g) according to the formula:

$$arg \min_{\sigma: J^P \to \mathbb{N}} w \cdot \sum_{j \in J^P} |\sigma(j) - j \cdot d| + (1-w) \cdot \text{edit}(\sigma, \sigma_{old})$$

where:
σ is the schedule and is represented by a total function σ: $J^P \to \mathbb{N}$ ;
$J^P$ are the production jobs;
$\mathbb{N}$ is an assigned starting time for each job;
|σ(j)−j·d| is a distance to the due date;
w∈[0, 1] is a constant representing a rescheduling threshold where w=1 means always choose an optimal schedule and w=0 leads to the schedule with minimal changes;
$\sigma_{old}$ is an old schedule;
edit is implemented using a Hamming distance; and
h) producing a product according to the rescheduling of the production scheduler and in view of available source materials.

9. The system according to claim 8, where said means includes said manufacturing execution system having said production management system, said production scheduler, and said event processor, said means further including said tracking and tracing system.

10. The system according to claim 9, wherein said tracking & tracing system is EPCIS-compliant.

* * * * *